(12) United States Patent
Watts

(10) Patent No.: US 6,779,092 B2
(45) Date of Patent: Aug. 17, 2004

(54) REORDERING REQUESTS FOR ACCESS TO SUBDIVIDED RESOURCE

(75) Inventor: Jonathan Manuel Watts, Folsom, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 192 days.

(21) Appl. No.: 10/146,621

(22) Filed: May 15, 2002

(65) Prior Publication Data

US 2003/0217224 A1 Nov. 20, 2003

(51) Int. Cl.[7] .............................................. G06F 12/00
(52) U.S. Cl. ........................... 711/158; 710/39; 710/51
(58) Field of Search ....................... 711/147–154, 105, 711/158; 710/244, 39–40, 51–52; 712/33

(56) References Cited

U.S. PATENT DOCUMENTS

| | | | |
|---|---|---|---|
| 5,745,913 A | * | 4/1998 | Pattin et al. ................. 711/105 |
| 5,941,979 A | * | 8/1999 | Lentz et al. .................... 712/33 |
| 6,219,769 B1 | | 4/2001 | Strongin et al. ............. 711/158 |
| 6,275,914 B1 | | 8/2001 | Jeddeloh ..................... 711/158 |
| 6,321,309 B1 | | 11/2001 | Bell et al. .................... 711/150 |
| 6,330,632 B1 | | 12/2001 | Watts .......................... 710/244 |
| 6,338,125 B1 | | 1/2002 | Kopser et al. .............. 711/150 |
| 6,526,484 B1 | * | 2/2003 | Stacovsky et al. .......... 711/158 |
| 6,564,304 B1 | * | 5/2003 | Van Hook et al. .......... 711/154 |
| 6,578,117 B2 | * | 6/2003 | Weber ......................... 711/151 |

* cited by examiner

Primary Examiner—Nasser Moazzami

(57) ABSTRACT

One embodiment comprises an apparatus for reordering requests for access to a subdivided resource. The apparatus includes a non-FIFO request buffer for temporarily storing the requests for access, a selector for selecting a next request from the request buffer, and a mechanism for outputting the next request to a controller for the resource. Another embodiment comprises a method for reordering requests for access to a subdivided resource. The method includes temporarily storing the requests for access, selecting a next request from among the stored requests in non-FIFO order, and outputting the next request to a controller for the resource.

38 Claims, 8 Drawing Sheets

REORDERING REQUESTS FOR ACCESS TO SUBDIVIDED RESOURCE

CROSS-REFERENCE TO RELATED APPLICATIONS

The present application is related to co-pending and commonly-owned U.S. patent application Ser. No. 10/091,760, filed Mar. 6, 2002, by inventor Jonathan M. Watts, and entitled "Re-Ordering Requests for Shared Resources," the disclosure of which is hereby incorporated by reference in its entirety.

BACKGROUND OF THE INVENTION

1. FIELD OF THE INVENTION

The present invention relates generally to electronic systems. More particularly, the invention relates to requests for access to a resource.

2. DESCRIPTION OF THE BACKGROUND ART

Dynamic random access memory (DRAM) is an important form of memory. DRAM can store data with high density because a DRAM cell requires as few as one transistor.

DRAM is commonly organized into memory banks. A single memory bank generally outputs the number of bits needed to fill the width of a data bus. For example, if the data bus is 32 bits wide, then a single memory bank outputs 32 bits. If the data bus is 64 bits wide, then a single memory bank outputs 64 bits. A multiple bank memory system utilizes a plurality of memory banks. By using a plurality of memory banks, memory accesses to different banks may be interleaved to increase performance by more fully utilizing the available data bus bandwidth.

In some memory systems, for example in synchronous DRAM (SDRAM) systems, a plurality of DRAM integrated circuits (often called "chips") may be used to create a memory bank. In other memory systems, for example in RDRAM developed by Rambus, Inc. of Los Altos, Calif., a single DRAM chip may include multiple memory banks. In other systems, parts with multiple internal banks may be stacked to provide a wider word width.

Despite current advances in memories, as CPU and memory bus speeds continue to increase, further improvements in memory systems are needed.

BRIEF DESCRIPTION OF THE DRAWINGS

Non-limiting and non-exhaustive embodiments of the present invention are described in the Figures, in which.

SUMMARY

One embodiment comprises an apparatus for reordering requests for access to a subdivided resource. The apparatus includes a non-FIFO request buffer for temporarily storing the requests for access, a selector for selecting a next request from the request buffer, and a mechanism for outputting the next request to a controller for the resource. Another embodiment comprises a method for reordering requests for access to a subdivided resource. The method includes temporarily storing the requests for access, selecting a next request from among the stored requests in non-FIFO order, and outputting the next request to a controller for the resource.

DETAILED DESCRIPTION

Figure 1:
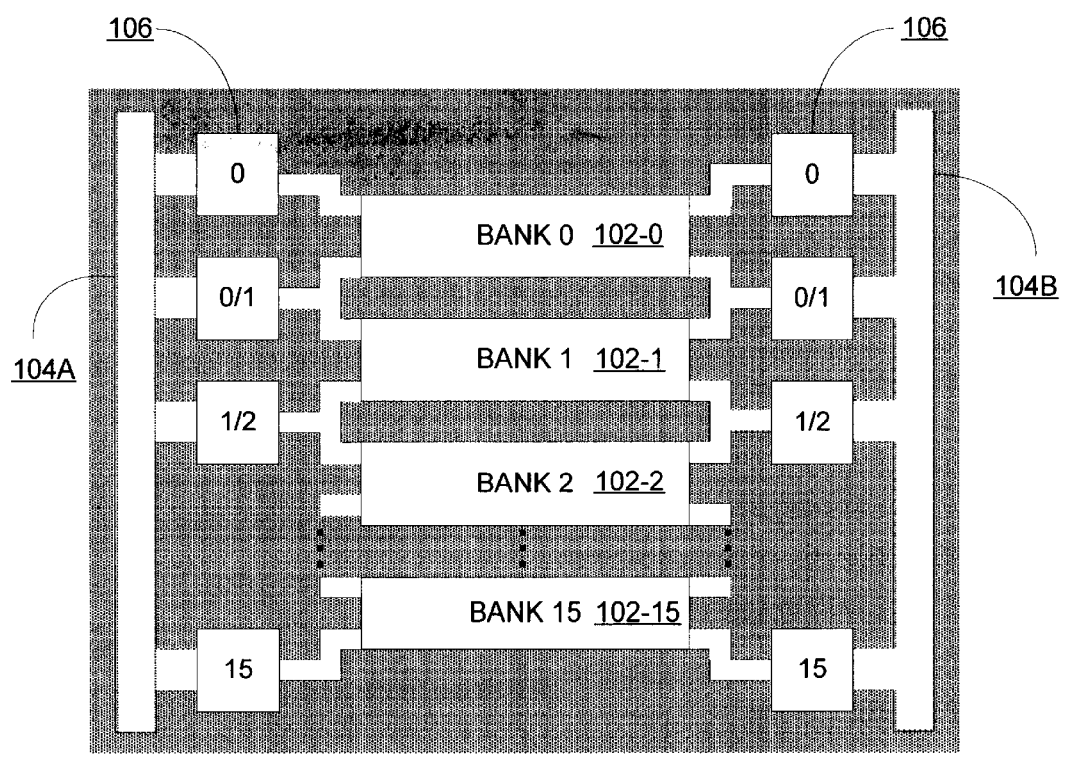
FIG. 1 is a simplified diagram illustrating a type of DRAM chip that includes multiple memory banks.

FIG. 1 is a simplified diagram illustrating a type of memory that includes multiple memory banks. The hypothetical DRAM chip depicted in FIG. 1 is merely an example of a type of memory with which the present invention may be used. Those familiar with memory architectures will recognize that the example multiple bank DRAM depicted in FIG. 1 is analogous in configuration to Rambus DRAMs ("RDRAMs") developed by Rambus, Inc. of Los Altos, Calif. Actual RDRAMs developed by Rambus, of course, have various differences. For example, it may have 32 memory banks (not the 16 memory banks of FIG. 1). There are various versions of RDRAM including 72 megabit (Mbit), 144 Mbit, and 288 Mbit versions.

The present invention may also be used with other types of memory. For example, the present invention is applicable to synchronous DRAMs ("SDRAMs") and double data rate ("DDR") SDRAMs as they also have multiple banks (typically four, for example). Application of the present invention to these other types of memory may be more straightforward because of the absence of certain peculiarities of RDRAMs (such as the shared sense amplifier configuration of RDRAMs).

Furthermore, the present invention may also be applied to reorder requests to other types of resources (not just memory). Other types of resources may have subdivisions similar to or analogous to the banks of memory.

Returning to FIG. 1, a multiple bank DRAM chip 100 that includes sixteen memory banks is depicted. The memory banks being labeled "Bank 0" 102-0 through "Bank 15" 102-15. Of course, sixteen is merely an example of a number of banks. The number of banks may be just as easily a different number (for example, four, eight, thirty-two, sixty-four, and so on).

The particular multiple bank DRAM 100 depicted in FIG. 1 includes two data buses, one to the left 104a and one to the right 104b. The two data out buses 104a and 104b each run the length of the sixteen memory banks (102-0 through 102-15). Seventeen groups of sense amplifiers 106 are shown between the memory banks 102 and the data buses 104. The groups of sense amplifiers are labeled 0, 0/1, 1/2, . . . 14/15, and 15.

Figure 2:
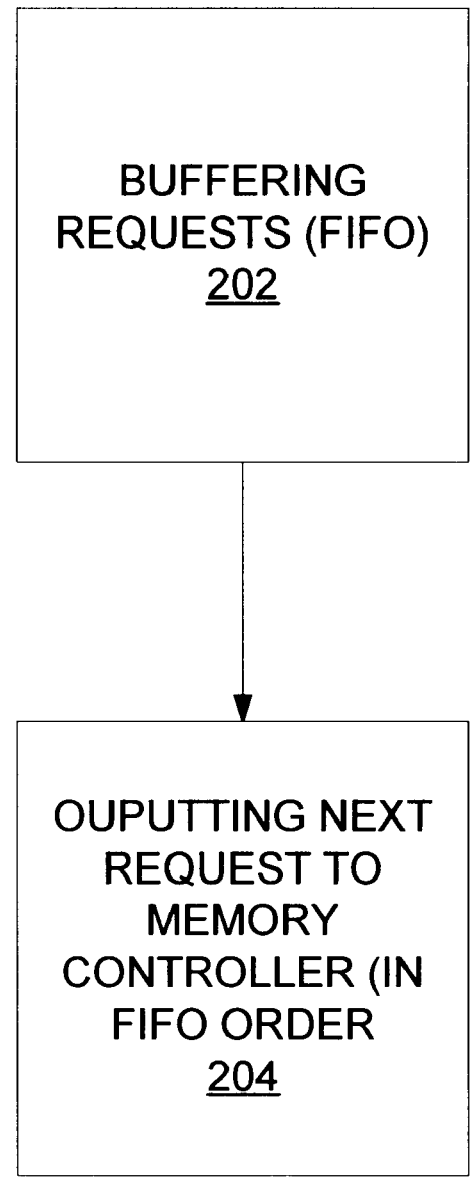
FIG. 2 is a flow chart depicting a conventional method for supplying requests for access to a multiple bank memory system.

FIG. 2 is a flow chart depicting a conventional method for supplying requests for access to a multiple bank memory system. The conventional method 200 as depicted in FIG. 2 includes just two steps (202 and 204).

In the first step 202, the requests may be buffered by a first-in-first-out (FIFO) buffer. This buffering allows requests to access memory to be received and to be put into a queue even while the memory is busy.

In the second step 204, the next request (the oldest one in the FIFO buffer) is output to the memory controller. The memory controller then processes the request.

Hence, memory requests to multiple bank memory systems are conventionally serviced in the order in which the requests are received. This can lead to idle time for the data bus if the next request needs to access an active memory bank (i.e., one already being accessed).

For example, referring to FIG. 1, each bank contains a number of "rows" of data. The sense amplifiers can hold the data from one row. In the 72 Mbit version of RDRAM, each row contains 9216 bits, each bank has 512 rows. If data is requested from a bank which is active, but not from the row that is active, then the controller would have to wait until access of the active row is complete prior to accessing the requested row.

Figure 3:
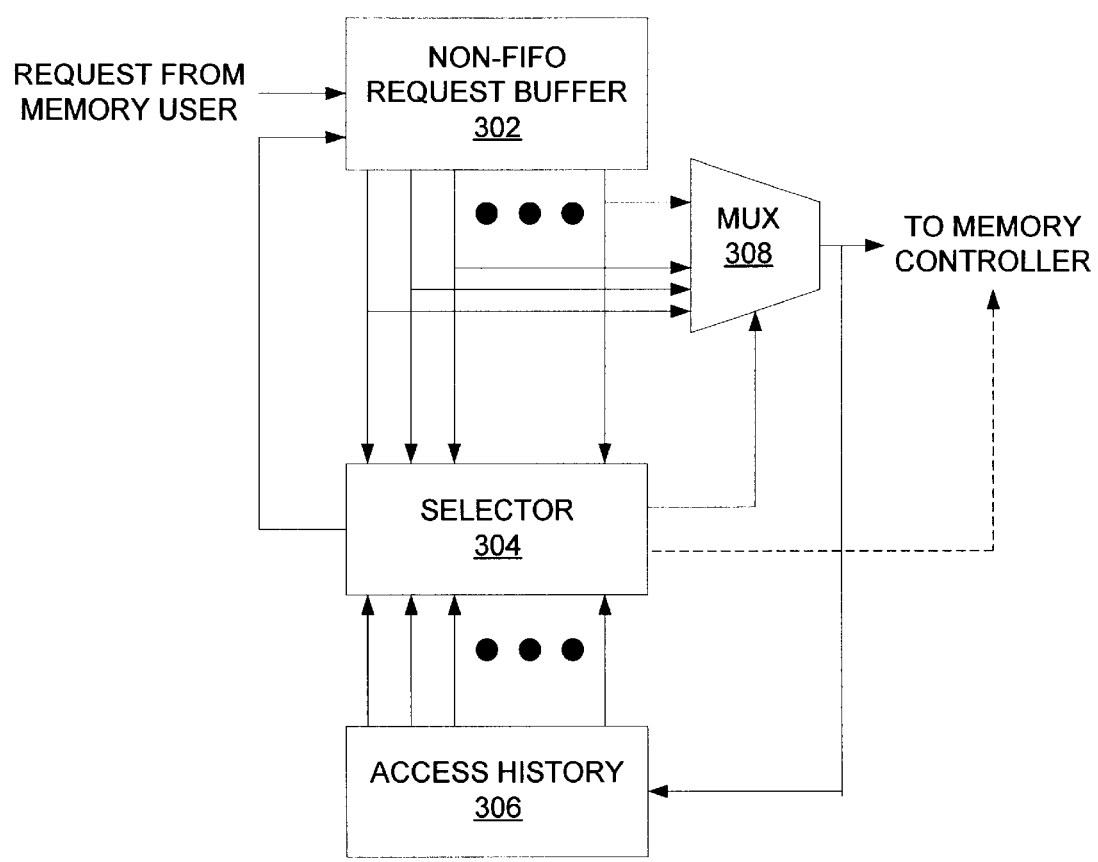
FIG. 3 is a diagram depicting an apparatus for reordering requests for access to a multiple bank memory in accordance with an embodiment of the invention.

FIG. 3 is a diagram depicting an apparatus for reordering requests for access to a multiple bank memory in accordance with an embodiment of the invention. The apparatus 300 as depicted in FIG. 3 includes a request buffer 302, a selector 304, an access history circuit 306, and a multiplexor (MUX) 308.

The request buffer 302 comprises a non-FIFO buffer for temporarily storing requests received from one or more memory user(s). The number of requests that can be stored in the request buffer 302 may be dictated by he needs of a particular system. The greater the number of requests which can be stored in the Request Buffer 302, the higher the efficiency that can be achieved. However, a greater number of requests may also increase the cost, the difficulty of the job of the Selector 304, and the variability of the service latency. For example, in one specific implementation, two request buffers may be used: one for read requests and one for write requests. In this example, each request buffer can hold up to eight requests. Pipelining may be implemented in the controller so that several additional requests may be in process at any given time.

While the request buffer 302 is not a FIFO buffer, it may be desirable to maintain the order in which the requests were received in the buffer 302. However, the order in which requests are taken would be a different order that is non-FIFO and to be determined by the selector 304.

The selector 304 selects a next request from the request buffer 302. In one embodiment, the selector 304 may use a history of recent memory accesses in determining the next request to select. The history of recent memory accesses may be provided by the access history circuit 306. The history of recent memory accesses may comprise recent requests that were output by the multiplexor 308 to the memory controller.

The selector 304 may include logic to select the next request in such a way as to avoid, if possible, the need to wait during memory bank recovery time (delay after the data transfer) and/or during memory bank access time (delay before the data transfer). This criterion for selecting the next request may be called the bank conflict avoidance criterion or simply the conflict avoidance criterion. For example, the selector 304 may prioritize (favor) the selection of a next request that needs to access only currently inactive memory banks (over requests that require accessing currently active memory banks). If bank conflicts are avoided, then typically both the access time (before the data transfer) and the recovery time (after the data transfer) may be "hidden" by pipelining (overlapping requests) so that those times do not adversely affect performance.

In one embodiment, if two or more requests are rated as equal based on the conflict avoidance criterion, then the selector's logic may favor the selection of the oldest request of the equally rated requests. In addition, the selector's logic may disfavor (lower priority of) those requests that would result in a conflict (accessing different banks) than one or more of the oldest requests. These two additional criteria help ensure forward progress of requests in the buffer 302 and prevent "starvation" of any memory user in that no request is forced to wait forever before access is granted.

In order for the selector 304 to properly make these selection decisions, it uses information about the structure and behavior of the memory system. That is, the selector 304 makes use of or applies information about which memory bank(s) is (are) affected by each request for memory access. In addition, the selector 304 makes use of or applies information about time intervals during which the affected memory banks will be unable to begin processing another request. Of course, the specific banks affected by a request and unusable time intervals are dependent on the specific system.

The following cycle description is representative only and given for purposes of illustration. The cycle described may not exactly correspond to a cycle from an actual memory part. First, a specific amount of time (e.g., 3 clock cycles) is typically required to activate a row of a bank by reading data from the row into the sense amplifiers. Second, a specific amount of time (e.g., 2 clock cycles) is typically required to read a particular word from the active row. Third, a specific amount of time (for example 2 clock cycles) is typically required for recovery time after the last word is read before a new row activation can be initiated. For example, the following may occur in the reading of four words from a single row of a bank:

| Cycle | Activity |
| --- | --- |
| 1 | activate row |
| 2 | wait for activate to complete |
| 3 | wait for activate to complete |
| 4 | initiate read of word 1 |
| 5 | initiate read of word 2 |
| 6 | initiate read of word 3; word 1 is on data bus |
| 7 | initiate read of word 4; word 2 is on data bus; initiate close of bank |
| 8 | word 3 is on data bus; wait for bank to close |
| 9 | word 4 is on data bus; can perform another row activation |

An optional technique which the selector 304 may employ is to make no selection on a cycle if none of the currently available requests in the buffer 302 could begin processing immediately by the memory system. For such cycles, since no request present in the buffer 302 could be started, deferring the selection of the next request does not cost performance (i.e., does not add further delay). This technique provides for the possibility that a new request may arrive which could be processed sooner than any of the requests currently present in the buffer 302. In order to implement this technique, a valid request signal may be sent to the memory controller so that a non-valid request may be indicated during cycles when no request is selected. This optional valid request signal is indicated by the dashed line in FIG. 3 from the selector 304 to the memory controller.

Once the selector 304 has determined which is the next request to be serviced, it controls the multiplexor 308 to output (make available) the next request to the memory controller. The multiplexor 308 may output the next request by selecting the line(s) associated with the storage of the next request in the buffer 302.

In addition, the selector 304 also notifies the non-FIFO request buffer 302 that the next request was taken so that the next request may be removed from the buffer 302. If required, the selector 304 also indicates a valid request to the memory controller.

The request buffer 302 removes the request which has been taken. The buffer 302 may also perform re-arrangement of requests within itself. For example, in one implementation, the remaining requests may be moved so as to keep all the requests contiguous and correctly ordered in the buffer 302.

Figure 4A:
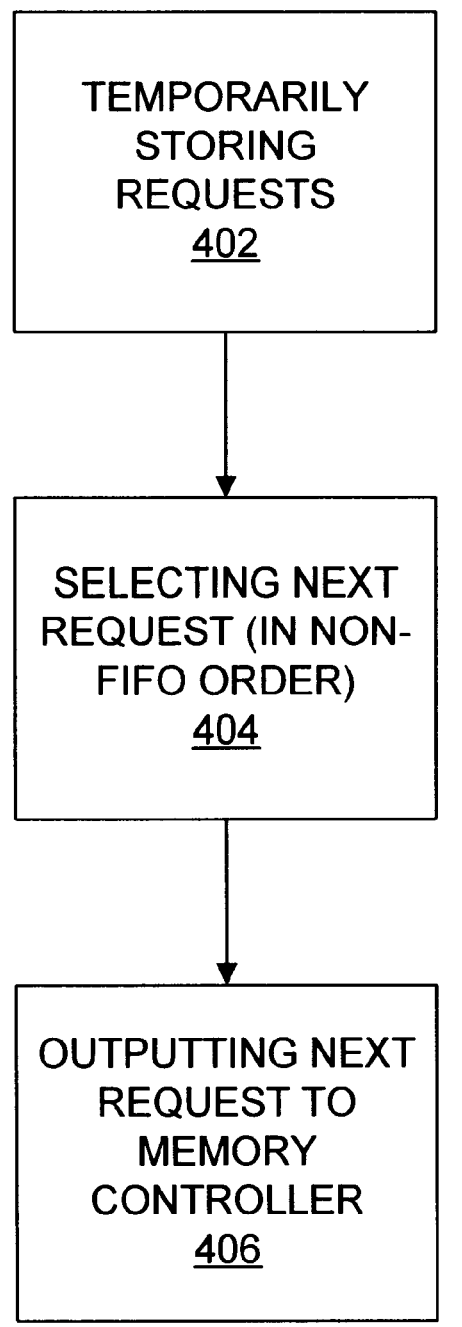
FIG. 4A is a flow chart depicting a method for reordering requests for access to a multiple bank memory system in accordance with an embodiment of the invention.

FIG. 4A is a flow chart depicting a method for reordering requests for access to a multiple bank memory system in accordance with an embodiment of the invention. The method 400 as depicted in FIG. 4A includes three steps (402, 404, and 406).

In the first step 402, the requests for access are stored temporarily. The requests for access may be requests for memory access received from one or more memory user(s). The temporary storage may be done in a non-FIFO request buffer 302. Requests may be added to the non-FIFO request buffer 302 when another request for access is received and there is space available in the buffer 302.

In the second step 404, the next request is selected from the temporary storage. The selection of next requests may be done in non-FIFO order in that the first in does not have to be the first out. The selection may be done by a selector 304. Embodiments of the selection step 404 performed by the selector 304 are described in more detail above in relation to FIG. 3.

In the third step 406, the next request is output to the memory controller. The outputting of the next request may be done by a multiplexor 308.

Figure 4B:
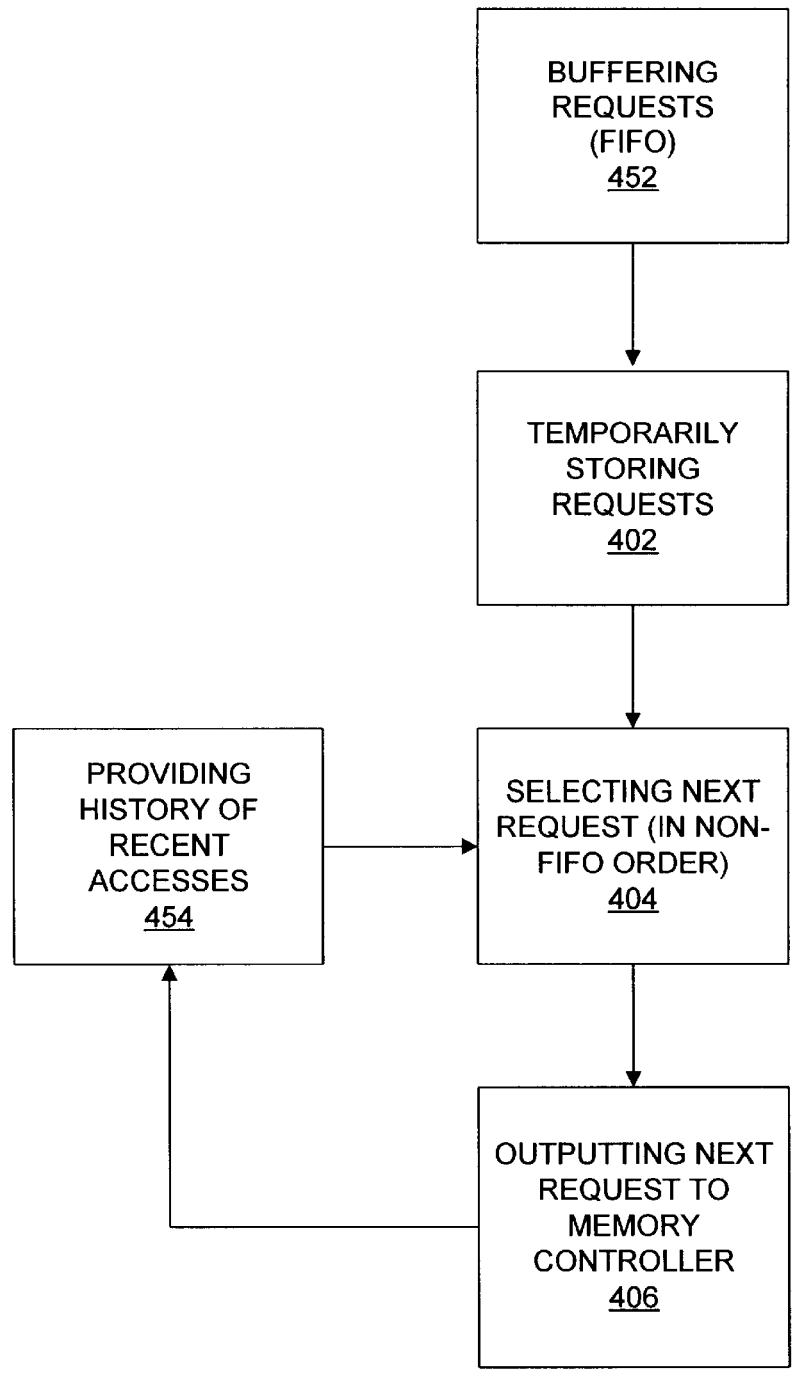
FIG. 4B is another flow chart depicting a method for reordering requests for access to a multiple bank memory system in accordance with an embodiment of the invention.

FIG. 4B is another flow chart depicting a method for reordering requests for access to a multiple bank memory system in accordance with an embodiment of the invention. The method 450 as depicted in FIG. 4B includes five steps (452, 402, 404, 406, and 454).

In the first step 452, the requests for access may be buffered. The requests for access may be requests for memory access received from one or more memory user(s). The buffering may be done, for example, using a FIFO buffer. The FIFO buffer may then pass the requests to the non-FIFO buffer 302 for temporary storage as described in the second step 402.

In the second step 402, the requests for access are stored temporarily in the non-FIFO request buffer 302. Requests may be added to the request buffer 302 when the FIFO buffer has a request to provide and the request buffer 302 has space available for the request.

In the third step (the selection step) 404, the next request is selected from the temporary storage. The selection of next requests may be done in non-FIFO order in that the first in does not have to be the first out. The selection may be done by a selector 304.

In the fourth step (the output step) 406, the next request is output to the memory controller. The outputting of the next request may be done by a multiplexor 308.

In the fifth step 454, a history of recent accesses may be derived and fed back to the selection step 404. In one embodiment, the history of recent accesses may comprise recent next requests output in the output step 406.

Figure 5:
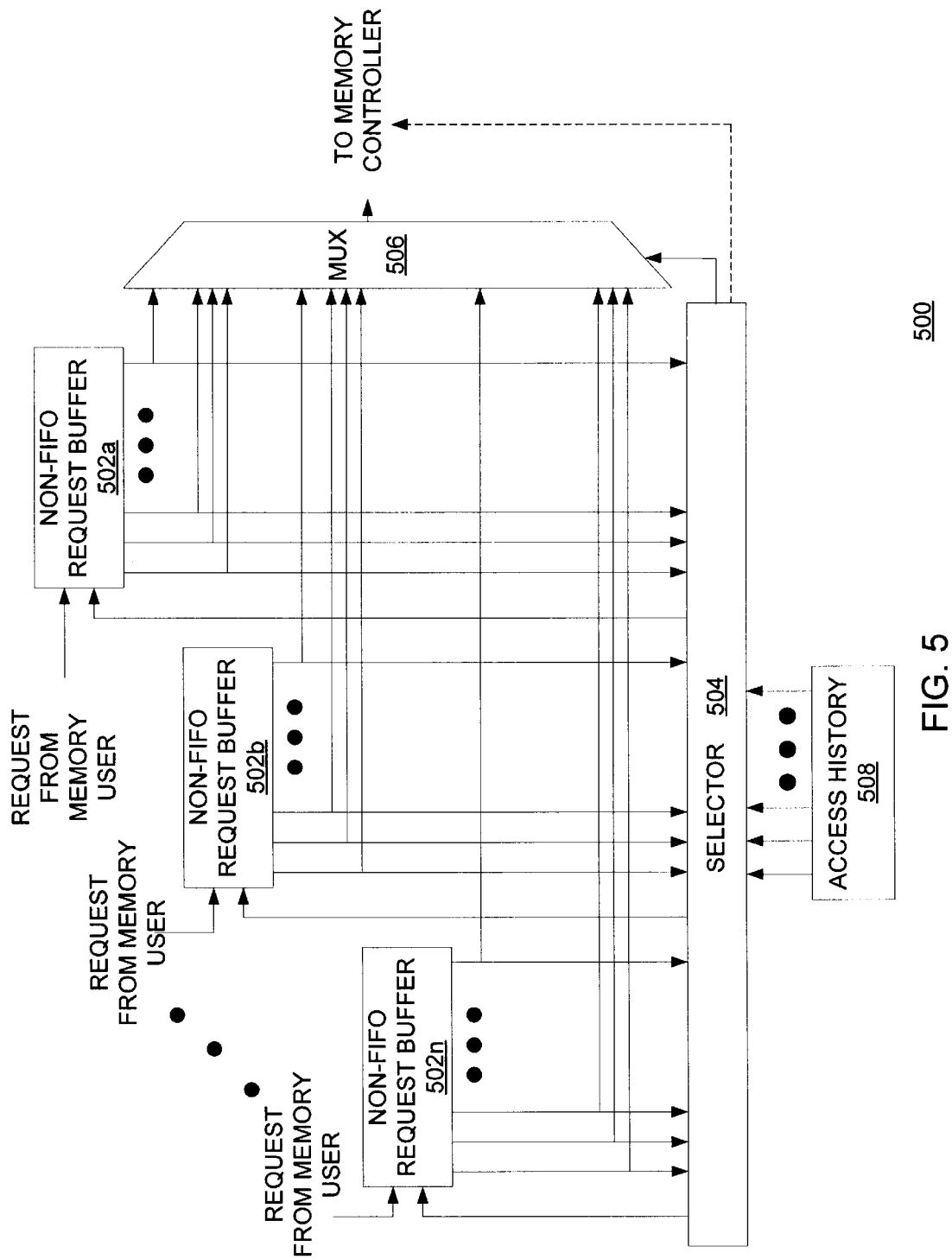
FIG. 5 is a diagram depicting another apparatus for reordering requests for access to a multiple bank memory in accordance with an embodiment of the invention.

FIG. 5 is a diagram depicting another apparatus for reordering requests for access to a multiple bank memory in accordance with an embodiment of the invention. The apparatus 500 as depicted in FIG. 5 includes multiple buffers 502 (502a, 502b, . . . , 502n), a selector 504, an access history circuit 506, and a multiplexor (MUX) 508.

The operation of the apparatus 500 in FIG. 5 is similar to the operation of the apparatus 300 in FIG. 3. However, the apparatus 500 of FIG. 5 illustrates an embodiment where multiple request buffers 502 (502a, 502b, . . . , 502n) receive requests from memory users.

In such an apparatus 500 with multiple request buffers 502, the selector 504 may utilize additional criteria for selecting between requests in the multiple buffers 502. For example, a round robin criterion may be used such that the next request is selected from a buffer 502 during that buffer's turn as assigned by the round robin. Another possible additional criterion would assign priorities to the different buffers 502 such that the next request is selected from a higher priority buffer 502 prior to being selected from a lower priority buffer 502. Another possible additional criterion would be to use one buffer 502 for as long as that buffer 502 has more requests, then switch buffers 502 when that buffer 502 has no more requests left.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

Figure 6A:
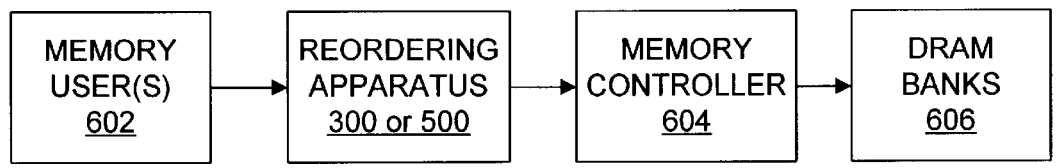
FIG. 6A is a diagram depicting a system including a reordering apparatus external to a memory controller in accordance with an embodiment of the invention.

FIG. 6A is a diagram depicting a system including a reordering apparatus external to a memory controller in accordance with an embodiment of the invention. The system 600 as depicted includes one or more memory user(s) 602, a reordering apparatus 300 or 500, a memory controller 604, and memory (DRAM) banks 606. In the embodiment shown in FIG. 6A, the reordering apparatus 300 or 500 is external to the memory controller 604.

Figure 6B:
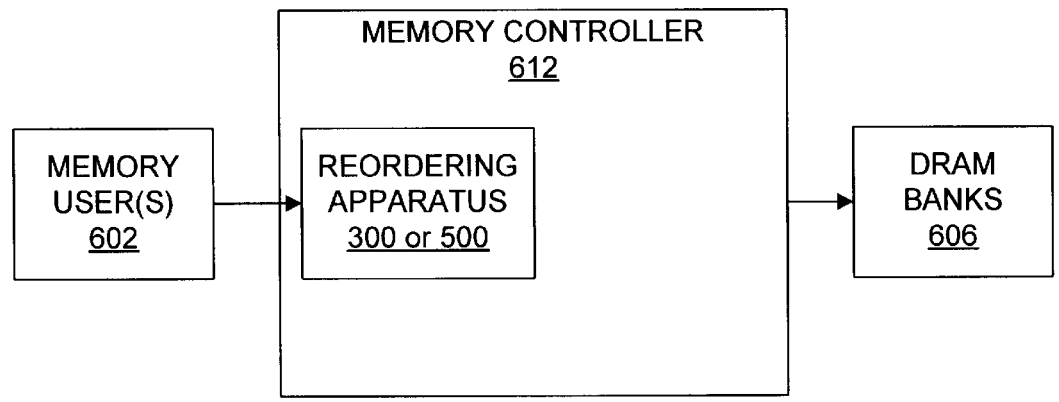
FIG. 6B is a diagram depicting a system including a reordering apparatus internal to a memory controller in accordance with an embodiment of the invention.

FIG. 6B is a diagram depicting a system including a reordering apparatus internal to a memory controller in accordance with an embodiment of the invention. The system 610 as depicted includes one or more memory user(s) 602, a reordering apparatus 300 or 500, a memory controller 612, and memory (DRAM) banks 606. In the embodiment shown in FIG. 6B, the reordering apparatus 300 or 500 is integrated into the memory controller 604.

Figure 6C:
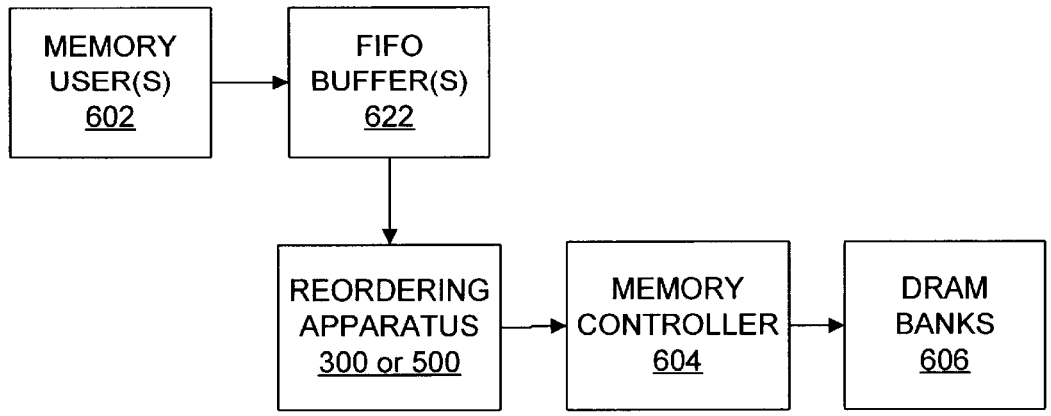
FIG. 6C is a diagram depicting a system including a reordering apparatus external to a memory controller and FIFO buffer(s) prior to the reordering apparatus in accordance with an embodiment of the invention.

FIG. 6C is a diagram depicting a system including a reordering apparatus external to a memory controller and FIFO buffer(s) prior to the reordering apparatus in accordance with an embodiment of the invention. The system 620 as depicted includes one or more memory user(s) 602, FIFO buffer(s) 622, a reordering apparatus 300 or 500, a memory controller 604, and memory (DRAM) banks 606. The system 620 in FIG. 6C is similar to the system 600 in FIG. 6A, but the system 620 in FIG. 6C includes FIFO buffer(s) 622 in place prior to the reordering apparatus 300 or 500.

Figure 6D:
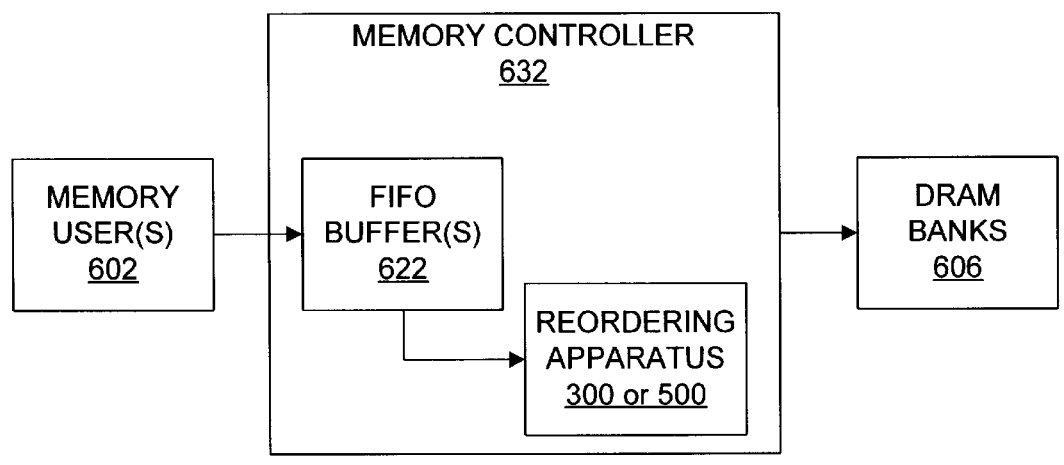
FIG. 6D is a diagram depicting a system including a reordering apparatus internal to a memory controller and FIFO buffer(s) prior to the reordering apparatus in accordance with an embodiment of the invention.

FIG. 6D is a diagram depicting a system including a reordering apparatus internal to a memory controller and FIFO buffer(s) prior to the reordering apparatus in accordance with an embodiment of the invention. The system 630 as depicted includes one or more memory user(s) 602, FIFO buffer(s) 622, a reordering apparatus 300 or 500, a memory controller 632, and memory (DRAM) banks 606. The system 630 in FIG. 6D is similar to the system 610 in FIG. 6B, but the system 630 in FIG. 6D includes FIFO buffer(s) 622 in place prior to the reordering apparatus 300 or 500. FIG. 6D has these FIFO buffers 622 integrated into the memory controller 632. Alternatively, the FIFO buffers 622 may be external to the memory controller 632.

The following discussion is meant to illustrate how the present invention may be used to advantage. The efficiency numbers in the discussion are meant to be rough based on various simplifying assumptions. This discussion of efficiency is meant for purposes of illustration only and not to be limiting. To a first order (rough) approximation, the probability of encountering a bank conflict with a hypothetical 16 bank RDRAM using conventional techniques would be $3/16$ or about 19%. Such a bank conflict will cause a wait for the conflict to clear (which may be, for example, eight clock cycles). Utilizing the re-ordering of the invention, the probability of a bank conflict may be reduced to roughly $3/16$ raised to the nth power $[(3/16)^n]$, where n is the number of entries in the request buffer from which the next request may be selected. For example, if there are eight entries in the request buffer, then the probability of a conflict would be roughly $(3/16)^8$=less than 1%. For purposes of simplicity, consider that the memory transactions are eight words long. Then the memory efficiency without the invention may be roughly:

$$\frac{8}{8+8(3/16)} = 84\%$$

On the other hand, with the re-ordering of the invention, and making several assumptions such as assuming eight entries in the request buffer, then the memory efficiency may be roughly:

$$\frac{8}{8+8(3/16)^8} = \text{over } 99\%$$

Similarly, a 4 bank SDRAM may have an efficiency without the invention of roughly:

$$\frac{8}{8+8(1/4)} = 75\%$$

With the re-ordering of the invention (and the same or similar assumptions as above), the efficiency may be improved to roughly:

$$\frac{8}{8+8(1/4)^8} = \text{over } 99\%$$

Per the above, the efficiency improvement increases as the number of banks decrease. The efficiency improvement also increases when the bank conflict penalty increases or the transfer length decreases. Note that the above approximation formula breaks down when the transfer length is less than the bank conflict penalty. Nevertheless, the conclusion that efficiency is improved is the point of the discussion and should remain valid.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. An apparatus for reordering requests for access to a subdivided resource, the apparatus comprising:
    a non-FIFO request buffer for temporarily storing the requests for access to the subdivided resource;
    a selector coupled to the request buffer, where the selector is configured for selecting a next request among the requests that are stored in the request buffer; and
    a mechanism coupled to the request buffer and to the selector, where the mechanism is configured for outputting the selected next request to a memory controller for the subdivided resource, the mechanism comprising a multiplexor (MUX) having an output coupled to the memory controller and inputs coupled to the request buffer, where the multiplexor is configured to output the selected next request to the memory controller after the selector has selected the next request in the request buffer, and where the memory controller processes the selected next request in order to access the subdivided resource.

2. The apparatus of claim 1, the apparatus further comprising:
    an access history module coupled to the selector and to the mechanism and to the memory controller, the access history module configured for providing a history of recent accesses to the selector for use in determining a next request to be selected by the selector.

3. The apparatus of claim 2, wherein the history of recent accesses comprises recent requests output to the memory controller by the mechanism.

4. The apparatus of claim 1, wherein the non-FIFO request buffer maintains the requests in a same order as received but outputs the requests in a different order determined by the selector.

5. The apparatus of claim 1, the apparatus further comprising:
    a FIFO request buffer for receiving the requests for access and for providing the requests to the non-FIFO request buffer.

6. The apparatus of claim 1, wherein the selector includes logic to select the next request based on a conflict avoidance criterion so as to avoid a need to wait during a resource subdivision related delay time that is associated with a transfer of data between the subdivided resource and the apparatus.

7. The apparatus of claim 6, wherein the selector favors an oldest request if two or more requests are rated as equal based upon the conflict avoidance criterion.

8. The apparatus of claim 6, wherein the selector disfavors a particular request that would result in a conflict with one or more of the oldest requests by lowering a priority of the particular request.

9. The apparatus of claim 1, wherein the selector has information about which resource subdivision is (are) affected by each request for access.

10. The apparatus of claim 9, wherein the selector has further information about time intervals during which the affected resource subdivision will be unable to begin processing another request.

11. The apparatus of claim 1, wherein the selector outputs a valid request to the memory controller so that a non-valid request may be indicated if no next request is selected by the selector for a particular cycle.

12. The apparatus of claim 1, wherein the selector controls the multiplexor to output the next request to the memory controller.

13. The apparatus of claim 12, wherein the selector notifies the non-FIFO request buffer that the next request was taken so that next request may be removed from the non-FIFO request buffer, and wherein the non-FIFO request buffer re-arranges remaining requests therein.

14. The apparatus of claim 1, wherein the apparatus comprises circuitry between the controller and one or more source(s) of the requests for access.

15. The apparatus of claim 1, wherein the apparatus comprises circuitry incorporated into the controller, and wherein the next request is output to other circuitry in the controller.

16. The apparatus of claim 1, wherein the selector selects a line in the request buffer, where the line is associated with the selected next request that is stored in the request buffer.

17. The apparatus of claim 1, wherein the selector notifies the request buffer that the next request was selected so that the next request is removed from the request buffer.

18. The apparatus of claim 6, wherein the selector favors the next request if the next request needs to access only a current inactive memory bank in the subdivided resource.

19. A method for reordering requests for access to a subdivided resource, the method comprising:

temporarily storing the requests for access to the subdivided resource;

selecting in non-FIFO order a next request from among the temporarily stored requests; and outputting the next request to a memory controller for the subdivided resource, wherein a multiplexor (MUX) has an output coupled to the memory controller, wherein the multiplexor is configured to output the selected next request to the memory controller after the step of selecting in non-FIFO order the next request, and wherein the memory controller processes the selected next request in order to access the subdivided resource.

20. The method of claim 19, the method further comprising:

providing a history of recent accesses to be used in selecting a next request.

21. The method of claim 20, wherein the history of recent accesses comprises recent requests output to the memory controller.

22. The method of claim 19, wherein the temporarily stored requests are maintained in a same order as received but may be output to the controller in a different order.

23. The method of claim 19, the method further comprising:

buffering the requests for access in a first-in-first-out order prior to temporarily storing the requests.

24. The method of claim 19, wherein the next request is selected based on a conflict avoidance so as to avoid an unnecessary need to wait during a resource subdivision related delay time that is associated with a transfer of data with the subdivided resource.

25. The method of claim 24, wherein an oldest request is favored if two or more requests are judged equal based on the conflict avoidance.

26. The method of claim 24, wherein a particular request are disfavored that would result in a conflict with one or more of the oldest requests by lowering a priority of the particular request.

27. The method of claim 19, wherein selecting the next request depends on information about which resource subdivision(s) is (are) affected by each request for access.

28. The method of claim 27, wherein selecting the next request further depends on information about time intervals during which the affected resource subdivision(s) will be unable to process another request.

29. The method of claim 19, wherein a valid request is output to the memory controller so that a non-valid request may be indicated if no next request is selected for a particular cycle.

30. The method of claim 27, wherein the resource comprises a multiple bank memory system, wherein a resource subdivision comprises a memory bank, and wherein a request for access comprises a request for memory access.

31. The method of claim 19, wherein the act of selecting in non-FIFO order comprises:

selecting a line in a request buffer, where the line is associated with the selected next request that is stored in the request buffer.

32. The method of claim 31, further comprising:

notifying the request buffer that the next request was selected so that the next request is removed from the request buffer.

33. The method of claim 19, wherein the act of selecting in non-FIFO order comprises:

favoring the next request if the next request needs to access only a current inactive memory bank in the subdivided resource.

34. A multiple bank memory system including request reordering, the system comprising:

a multiple bank memory;

a memory controller;

means for temporarily storing requests for access to the multiple bank memory;

means for selecting a next request from among the stored requests in non-FIFO order; and means for outputting the next request to the memory controller, wherein the means for outputting comprises a multiplexor (MUX) having an output coupled to the memory controller, wherein the multiplexor is configured to output the selected next request to the memory controller after selecting in non-FIFO order the next request, and wherein the memory controller processes the selected next request in order to access the multiple bank memory.

35. An apparatus for reordering requests for access to a multiple bank memory, the apparatus comprising:

a plurality of non-FIFO request buffers for temporarily storing the requests for access to the multiple bank memory;

a selector coupled to the request buffers, where the selector is configured for selecting a next request from the plurality of non-FIFO request buffers; and a multiplexor coupled to the selector, the multiplexor configured for receiving the next request and outputting the next request to a memory controller, the multiplexor having an output coupled to the memory controller and inputs coupled to the request buffers, where the multiplexor is configured to output the selected next request to the memory controller after the selector has selected the next request in one of the request buffers, and where the memory controller processes the selected next request in order to access the multiple bank memory.

36. The apparatus of claim 35, wherein the selector includes logic that utilizes a round robin type algorithm in selecting the non-FIFO request buffer from which the next request will be selected.

37. The apparatus of claim 35, wherein the selector includes logic that favors sequentially selecting requests from a same non-FIFO request buffer and disfavors switching buffers in selecting requests.

38. The apparatus of claim 35, wherein the selector prioritizes non-FIFO request buffers in selecting the next request.

* * * * *